United States Patent

Donelson et al.

[11] Patent Number: 5,401,460
[45] Date of Patent: Mar. 28, 1995

[54] METHOD FOR SINTERING FUEL CELL ELECTRODES USING A CARRIER

[75] Inventors: Richard Donelson, Victoria, Australia; E. S. Bryson, Downers Grove, Ill.

[73] Assignee: M-C Power Corporation, Burr Ridge, Ill.

[21] Appl. No.: 160,061

[22] Filed: Nov. 23, 1993

[51] Int. Cl.⁶ .......................... B22F 7/00; H01M 4/88
[52] U.S. Cl. ........................................ 419/2; 419/38; 429/16; 429/45
[58] Field of Search ................ 419/2, 38; 429/16, 45; 432/258, 253

[56] References Cited

U.S. PATENT DOCUMENTS

| | | |
|---|---|---|
| 3,679,481 | 7/1972 | Pinard . |
| 4,202,007 | 5/1980 | Dougherty et al. . |
| 4,460,666 | 7/1984 | Dinkler et al. . |
| 4,994,221 | 2/1991 | Tanaka et al. . |
| 5,079,674 | 1/1992 | Malaspina . |
| 5,110,541 | 5/1992 | Yamamasu et al. . |

*Primary Examiner*—John S. Maples
*Attorney, Agent, or Firm*—Speckman, Pauley & Fejer

[57] ABSTRACT

A carrier for conveying components of a fuel cell to be sintered through a sintering furnace. The carrier comprises a metal sheet coated with a carbon-based paint, the carbon-based paint comprising an organic binder. The carbon-based paint may be an alcohol or a solvent-based paint or a water-based paint.

6 Claims, No Drawings

METHOD FOR SINTERING FUEL CELL ELECTRODES USING A CARRIER

The U.S. Government has a paid-up license in this invention and the right in limited circumstances to require the patent owner to license others on reasonable terms as provided for by the terms of Contract No. DE-AC21-90MC27394 awarded by the U.S. Department of Energy.

BACKGROUND OF THE INVENTION

1. Field of the Invention

This invention relates to a process and apparatus for sintering of electrodes for fuel cells, in particular, electrodes for molten carbonate fuel cells.

1. Description of Prior Art

The present invention relates to a method and apparatus for preparing porous electrodes for use in a variety of applications. One principal use is for the preparation of porous electrodes to be employed in molten carbonate fuel cells.

Molten carbonate fuel cells typically operate at high temperatures of about 600°–750° C. to convert chemical energy to D.C. electricity. Fuels such as hydrogen, carbon monoxide or methanol react with oxidant gases such as air or oxygen to produce the electrical energy.

Typically, these fuel cells operate in stacks of individual fuel cell units. Each fuel cell unit contains an anode, a cathode and an electrolyte structure separating the two electrodes. The electrode structure is prepared by mixing the component powders thereof with a suitable organic binder and forming the "green" composition into a flattened structure such as a sheet or a tape formed by a tape-casting method. The flattened structure is subsequently sintered at sufficient conditions to bind the particles together into a porous structure. To effect sintering of the "green" electrodes, the electrodes are loaded onto a conveyor means which carries the "green" electrodes into the sintering furnace.

Known sintering methods for making electrodes consist of using either carbon blocks or carbon paper as a support for the "green" electrode as it is conveyed through the sintering furnace. However, carbon blocks have the disadvantage that they are either very fragile or very thick and heavy. In the latter case, they, of course, also have a high thermal mass, thereby affecting the amount of time and energy required for sintering. The use of carbon paper is also problematic due to bubbling and reaction with the electrode and, possibly, with the electrode binder, causing flaws in the sintered electrode. The requirements for a suitable sintering carrier for electrodes to be sintered are that it not impede the shrinkage of the electrode as it is heated, that it not compromise the flatness of the resulting electrode structure and that it not add impurities to the resulting electrode structure.

U.S. Pat. No. 5,110,541 teaches a method for manufacturing a porous electrode for molten carbonate fuel cells in which a mixture of nickel powders and a pulverized aluminum-based intermetallic compound is formed into a slurry, shaped into a sheet or tape and sintered to form the porous electrode. The aluminum-based intermetallic compound, in accordance with the teachings of this patent, provides reinforcement for the porous electrode.

U.S. Pat. No. 4,994,221 teaches a method for producing a carbon electrode in which a carbon material is directly deposited on an electroconductive electrode substrate by chemical vapor deposition and the substrate, coated with the carbon material, is subjected to an electrochemical treatment so that the carbon material is doped with a charge carrier material capable of being reversibly intercalated therein and deintercalated therefrom. The electrochemically treated substrate is compressed, forming a thin plate-shaped carbon electrode having a high density.

U.S. Pat. No. 4,460,666 teaches an electrode for an electrolytic cell consisting of an embossed electrically conductive substrate coated with a sintered porous metal powder on at least one major surface thereof. The substrate material is preferably a metallic material such as nickel, stainless steel or nickel-plated steel. The substrate is coated by passing through a container filled with a slurry of metal powder, dried to evaporate water contained in the slurry, and then sintered.

U.S. Pat. No. 5,079,674 teaches an electrode for use in supercapacitors made by adding to an aqueous solution of metal salts porous carbon particles to form a slurry, the metal salts adsorbing onto the porous carbon particles. The metal salts are converted to equivalent metal hydroxides or complex oxides, and the resulting solution is decanted. An emulsion of fluorocarbon polymer is added to the decanted solution and kneaded until the fluorocarbon polymer is fibrillated. The kneaded admixture is formed into a sheet and dried in an oven, the dried sheet then being laminated to one or both sides of a separator.

U.S. Pat. No. 4,202,007 teaches miniaturized integrated circuit devices formed by mixing finely divided particles of a substrate and other chemical additives and casting the resulting mixture into slips to form pliant green sheets. An embryonic conductor pattern is coated on the green sheet which is then sintered.

U.S. Pat. No. 3,679,481 teaches a process for manufacturing sintered carrier-type negative electrodes for alkaline storage batteries.

SUMMARY OF THE INVENTION

It is an object of this invention to provide a process and apparatus for sintering electrodes for use in fuel cells which produces exceptionally flat electrodes.

It is another object of this invention to provide a process and apparatus for sintering electrodes for use in fuel cells which does not impede the shrinkage of the electrodes during sintering.

It is yet another object of this invention to provide a process and apparatus for sintering of electrodes for fuel cells which eliminates sticking of the electrodes to the support upon which the electrode is placed for sintering.

It is yet another object of this invention to provide an apparatus for sintering of electrodes for fuel cells which avoids diffusion of unwanted elements from the electrode supports into the electrodes.

These and other objects of this invention are achieved by a carrier for conveying components of a fuel cell to be sintered, in particular electrodes thereof, comprising a metal sheet coated with a carbon-based paint, said carbon-based paint comprising an organic binder. Such coated metal sintering carrier makes the sintering of electrodes for a fuel cell having an active area greater than about 1 square meter possible in a reducing atmosphere, continuous belt furnace, without impeding the shrinkage or compromising the flatness of the subject electrodes. Due to the nature of the coating, sticking of the electrode to the carrier is prevented and flatness of the electrode is maintained. In addition, the sintering carrier in accordance with this invention provides even sintering of the electrodes. It is also designed to be low in weight, thus reducing the physical load on the conveyor belt on which the "green" electrode is conveyed through the sintering furnace.

A process for sintering electrodes for use in electrochemical cells in accordance with one embodiment of this invention comprises placing a "green" electrode in the form of a flat structure on an electrode sintering carrier, which carrier comprises a metal sheet coated with a carbon-based paint. The electrode sintering carrier carrying the "green" coated electrode is conveyed into a sintering furnace in which the electrode is heated to a sintering temperature. The electrode sintering carrier with the sintered electrode is then removed from the sintering-furnace.

DESCRIPTION OF PREFERRED EMBODIMENTS

As previously stated, the critical attributes of a carrier for conveying components of a fuel cell to be sintered are its ability to produce flat electrodes without impeding the shrinkage of the electrodes during the sintering process and the ability to avoid diffusion of unwanted elements into the electrodes during the sintering process. In addition, it is important that the carrier be able to accommodate electrodes having an active area greater than about 1 square meter.

Accordingly, a carrier for conveying components of a fuel cell to be sintered in accordance with one embodiment of this invention comprises a metal sheet coated with a carbon-based paint, which carbon-based paint comprises an organic binder. The material comprising the metal sheet is determined by the temperature of the sintering process, the durability of the material, and the ability to prevent diffusion of unwanted elements from the carrier into the electrodes. Preferably, the metal sheet is constructed of a material selected from the group consisting of a nickel-based alloy, inconel 600, nickel 200 and 300 series stainless steel.

The carbon-based paint coating the metal sheet in accordance with a preferred embodiment of this invention comprises between about 0.5% to about 5.0% of an organic binder.

In accordance with one embodiment of this invention, the carbon-based paint used to coat the metal sheet is an alcohol or solvent-based paint. A suitable organic binder for use with said alcohol or solvent-based paint in accordance with one embodiment of this invention, is ethylcellulose. Such paint is preferred where drying speed is important. However, in accordance with another embodiment of this invention, a water-based paint instead of the alcohol or solvent-based paint may be utilized. A suitable organic binder for use with said water-based paint, in accordance with one embodiment of this invention, is hydroxypropyl methylcellulose. Such water-based paint, although not drying as fast as the alcohol or solvent-based paint, eliminates the need for an explosion-proof painting area or fume hood.

For purposes of coating the surface of the metal sheet, the viscosity of the water-based paint is preferably between about 100 and 200 centipoise, depending upon temperature. The viscosity of the solvent-based paint is preferably near the viscosity of water.

A process for sintering electrodes for use in electrochemical cells in accordance with this invention comprises placing an electrode in the form of a flat structure on an electrode sintering carrier, which carrier comprises a metal sheet coated with a carbon-based paint, conveying the carrier into a sintering furnace, heating the electrode to a sintering temperature, and removing the carrier with the sintered electrode from the sintering furnace.

In a preferred embodiment of the process of this invention, sintering is carried out in a reducing atmosphere.

In accordance with one embodiment of this invention, the carbon-based paint is a solvent-based paint having a viscosity of about the viscosity of water. In accordance with another embodiment of this invention, the carbon-based paint is a water-based paint having a viscosity preferably between about 100 and 200 centipoise.

In a particularly preferred embodiment of the process of this invention, the carbon-based paint comprises between about 0.5% and about 5.0% of an organic binder.

The metal sheet, which may be in the form of a continuous belt, is constructed of a material selected from the group consisting of a nickel-based alloy, inconel 600, nickel 200 and 300 series stainless steel.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for sintering electrodes for use in electrochemical cells comprising:
    placing an electrode in the form of a flat structure on an electrode sintering carrier, said electrode sintering carrier comprising a metal sheet coated with a carbon-based paint;
    conveying said electrode sintering carrier into a sintering furnace;
    heating said electrode to a sintering temperature; and
    removing said electrode sintering carrier with said sintered electrode from said sintering furnace.

2. A process in accordance with claim 1, wherein said sintering furnace has a reducing atmosphere.

3. A process in accordance with claim 1, wherein said carbon-based paint is one of a solvent-based paint and a water-based paint, said water-based paint having a viscosity between about 100 and 200 centipoise and said solvent-based paint having a viscosity of about the viscosity of water.

4. A process in accordance with claim 1, wherein said carbon-based paint comprises between about 0.5% and about 5.0% of an organic binder.

5. A process in accordance with claim 1, wherein said metal sheet is constructed of a material selected from the group consisting of a nickel-based alloy, inconel 600, nickel 200 and 300 series stainless steel.

6. A process in accordance with claim 4, wherein said organic binder is selected from the group consisting of hydroxypropyl methylcellulose and ethylcellulose.

* * * * *